United States Patent
Katayama et al.

(10) Patent No.: US 7,750,847 B2
(45) Date of Patent: Jul. 6, 2010

(54) VEHICLE POSITION DETECTION SYSTEM

(75) Inventors: Mutsumi Katayama, Suitama (JP); Kazuyuki Maruyama, Saitama (JP); Kazumitsu Kushida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 302 days.

(21) Appl. No.: 11/902,904

(22) Filed: Sep. 26, 2007

(65) Prior Publication Data
US 2008/0238771 A1 Oct. 2, 2008

(30) Foreign Application Priority Data
Sep. 29, 2006 (JP) .............................. 2006-268596

(51) Int. Cl.
*G01S 5/14* (2006.01)
(52) U.S. Cl. .................................. 342/357.14
(58) Field of Classification Search ............. 342/357.14
See application file for complete search history.

(56) References Cited

U.S. PATENT DOCUMENTS

| | | | |
|---|---|---|---|
| 6,349,259 B1 * | 2/2002 | Sato | 701/207 |
| 6,405,132 B1 | 6/2002 | Breed et al. | |
| 2004/0245853 A1 * | 12/2004 | Odagawa et al. | 303/191 |
| 2006/0224315 A1 * | 10/2006 | Okumura | 701/211 |

FOREIGN PATENT DOCUMENTS

JP 3773040 B2 2/2006

OTHER PUBLICATIONS

Pang et al., "Vehicle Location and Navigation Systems based on LEDs," 1998, pp. 1-5, XP007903688.
Pang et al., "LED Location Beacon System Based on Processing of Digital Images," IEEE Transactions on Intelligent Transportation Systems, vol. 2, No. 3, pp. 135-150, Sep. 2001, XP011028397.
Hugh et al., "Positioning Beacon System Using Digital Camera and LEDs," IEEE Transactions on Vehicular Technology, vol. 52, No. 2, pp. 406-419, Mar. 2003, XP011080813.

* cited by examiner

*Primary Examiner*—Thomas H Tarcza
*Assistant Examiner*—Harry Liu
(74) *Attorney, Agent, or Firm*—Birch, Stewart, Kolasch & Birch, LLP

(57) ABSTRACT

A vehicle position detection system is provided to detect a vehicle position with higher accuracy. The vehicle position detection system includes a GPS receiving device mounted on the vehicle to receive GPS signals from a GPS satellite, a light beacon communication device mounted on the vehicle to receive light beacon information from a light beacon arranged in front of an intersection of a road, and a central processing unit mounted on the vehicle to correct a position of the vehicle based on the light beacon information upon reception of the light beacon information by the light beacon communication device.

12 Claims, 12 Drawing Sheets

FIG. 10
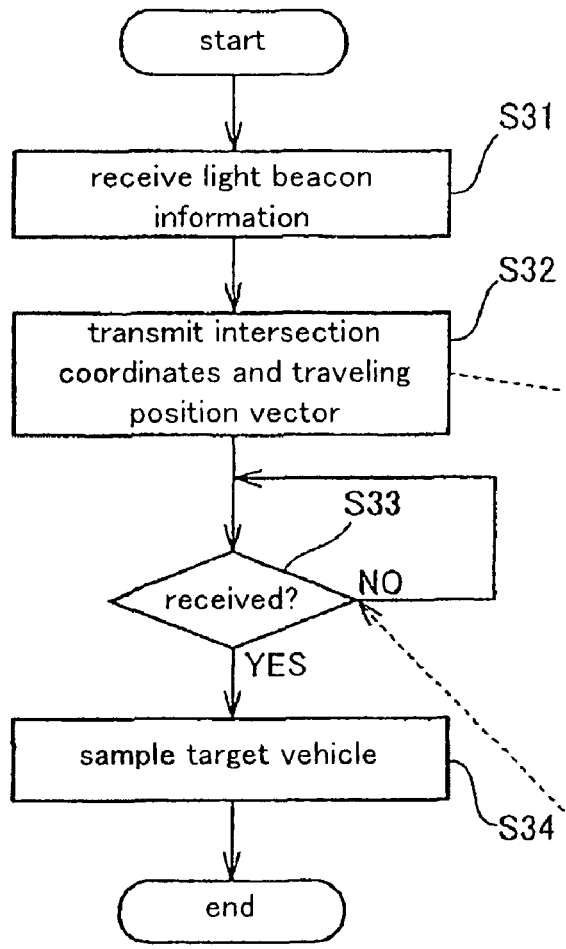
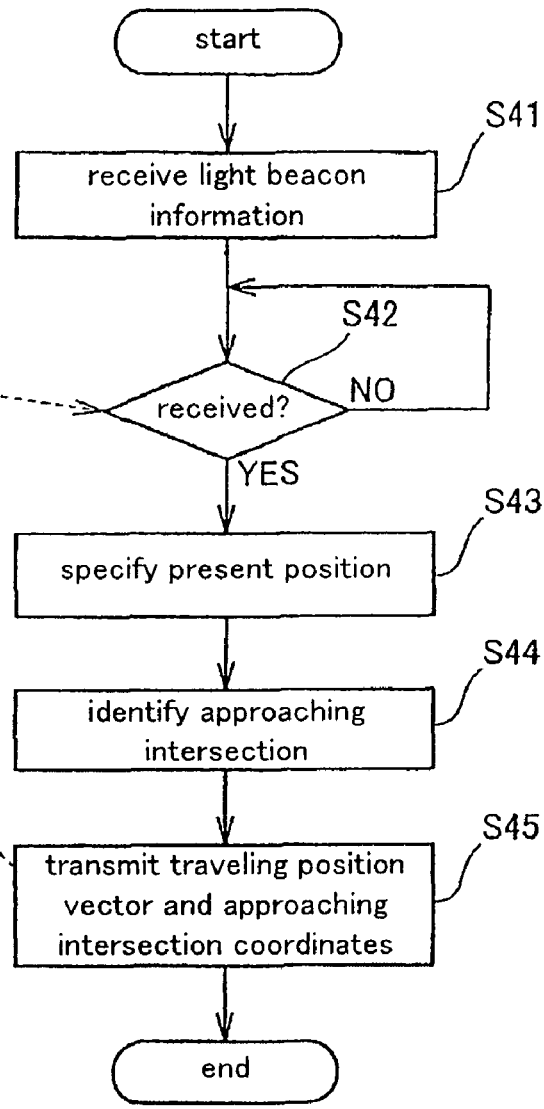

VEHICLE POSITION DETECTION SYSTEM

CROSS-REFERENCE TO RELATED APPLICATIONS

This nonprovisional application claims priority under 35 U.S.C. §119(a) on Patent Application No. 2006-268596, filed in Japan on Sep. 29, 2006, the entirety of which is incorporated herein by reference.

BACKGROUND OF THE INVENTION

1. Field of the Invention

The present invention relates to a vehicle position detection system, and more particularly to a vehicle position detection system which detects a vehicle position by using GPS (Global positioning system) signals and light beacon information.

2. Background of the Invention

Conventionally, a device has been used to detect a position of a vehicle using GPS signals (see, for example, Japanese Patent 3773040 in FIG. 1, paragraph [0031]). As shown in FIG. 1 of Japanese Patent 3773040, a DGPS 13 receives GPS signals via an antenna ATgps and measures a present position of a vehicle.

However, a range of error of the position detected based on the GPS signals is about 30 m. Therefore, there is a need to reduce the range of error between the detected position and an actual position.

SUMMARY OF THE INVENTION

Accordingly, it is an object of the present invention to provide a vehicle position detection system which can detect a vehicle position with higher accuracy.

To achieve the above-mentioned object, according to a first aspect of the present invention, a vehicle position detection system includes a GPS receiving part or device mounted on the vehicle to receive GPS signals from a GPS satellite, a light beacon communication means or device or device mounted on the vehicle to receive light beacon information from a light beacon arranged in front of an intersection of a road, and a central processing unit mounted on the vehicle to correct a position of the vehicle based on the light beacon information upon reception of the light beacon information by the light beacon communication means or device.

Furthermore, according to a second aspect of the present invention, the light beacon information includes vehicle lane information which contains a traveling lane on which the vehicle travels, and position coordinates information which contains position coordinates of the light beacon.

Furthermore, according to a third aspect of the present invention, the central processing unit, after the light beacon communication means or device receives the position coordinates information of the light beacon information, calculates the position of the vehicle based on the light beacon information received by the light beacon communication means or device and, at the same time, stores the position of the own vehicle in a memory means or device or displays the calculated position of the vehicle on a display part within a predetermined condition.

Furthermore, according to a fourth aspect of the present invention, the central processing unit, after the light beacon communication means or device receives the position coordinates information of the light beacon information, assigns priority to the position of the vehicle based on a self-contained navigation using coordinates of the position coordinates information as a base point within a predetermined condition, and assigns priority to the position of the vehicle calculated based on the GPS signals received by the GPS receiving part or device outside the predetermined condition.

Furthermore, according to a fifth aspect of the present invention, the central processing unit includes a communication means or device which exchanges the position coordinates information of the light beacon information with position coordinates information of light beacon information of other vehicle.

Furthermore, according to a sixth aspect of the present invention, the central processing unit includes a vehicle approaching prediction means or device which performs the prediction of approaching of the vehicle and other vehicle based on the position of the vehicle which is determined based on the position coordinates information of the light beacon information and a position of other vehicle which is determined based on the position coordinates information of the light beacon information received by the communication means or device.

According to the first aspect of the present invention, since the light beacon is fixedly installed on a ground, the light beacon can feed extremely accurate position information with respect to the position of the vehicle. Therefore, the present invention has an advantage that the position of the vehicle is corrected based on such light beacon information. Accordingly, it is possible to detect the position of the vehicle with high accuracy.

Furthermore, according to the second aspect of the present invention, based on the vehicle lane information, the lane on which the vehicle is traveling is identified. When the lane is identified, it is possible to clarify the relative position of the vehicle with other vehicle which travels in parallel to the vehicle or other oncoming vehicle.

Furthermore, according to the third aspect of the present invention, although the GPS receiving part or device is mounted on the vehicle, upon reception of the light beacon information, the central processing unit assigns priority to the light beacon information. The traveling of the vehicle is maintained without changing over the light beacon information to the GPS information within the predetermined condition such as a fixed time or a fixed distance. Accordingly, it is possible to detect the position of the vehicle with the accuracy higher than the accuracy of the position detection based on the GPS information.

Furthermore, according to the fourth aspect of the present invention, it is possible to detect the position of the vehicle with high accuracy without a GPS error within the predetermined condition, while it is possible to detect the position of the vehicle with the position error smaller than the position error generated due to the self-contained navigation outside the predetermined condition.

Furthermore, according to the fifth aspect of the present invention, it is possible to exchange the accurate vehicle position coordinates with no GPS error between the vehicles. Even when neither one of both vehicles possesses the map information, both vehicles can possess the intersection information in common. That is, it is possible to sample the target vehicle.

Furthermore, according to the sixth aspect of the present invention, it is possible to perform the prediction of approaching of the vehicle and other vehicle with high accuracy. Therefore, by informing an occupant of the approaching of the vehicle and other vehicle using an alarm or the like, it is possible to avoid the approaching of the vehicle and other vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10 is a flowchart showing the manner of operation when signals are received from other vehicle;

DETAILED DESCRIPTION OF THE PREFERRED EMBODIMENTS

Figure 1:
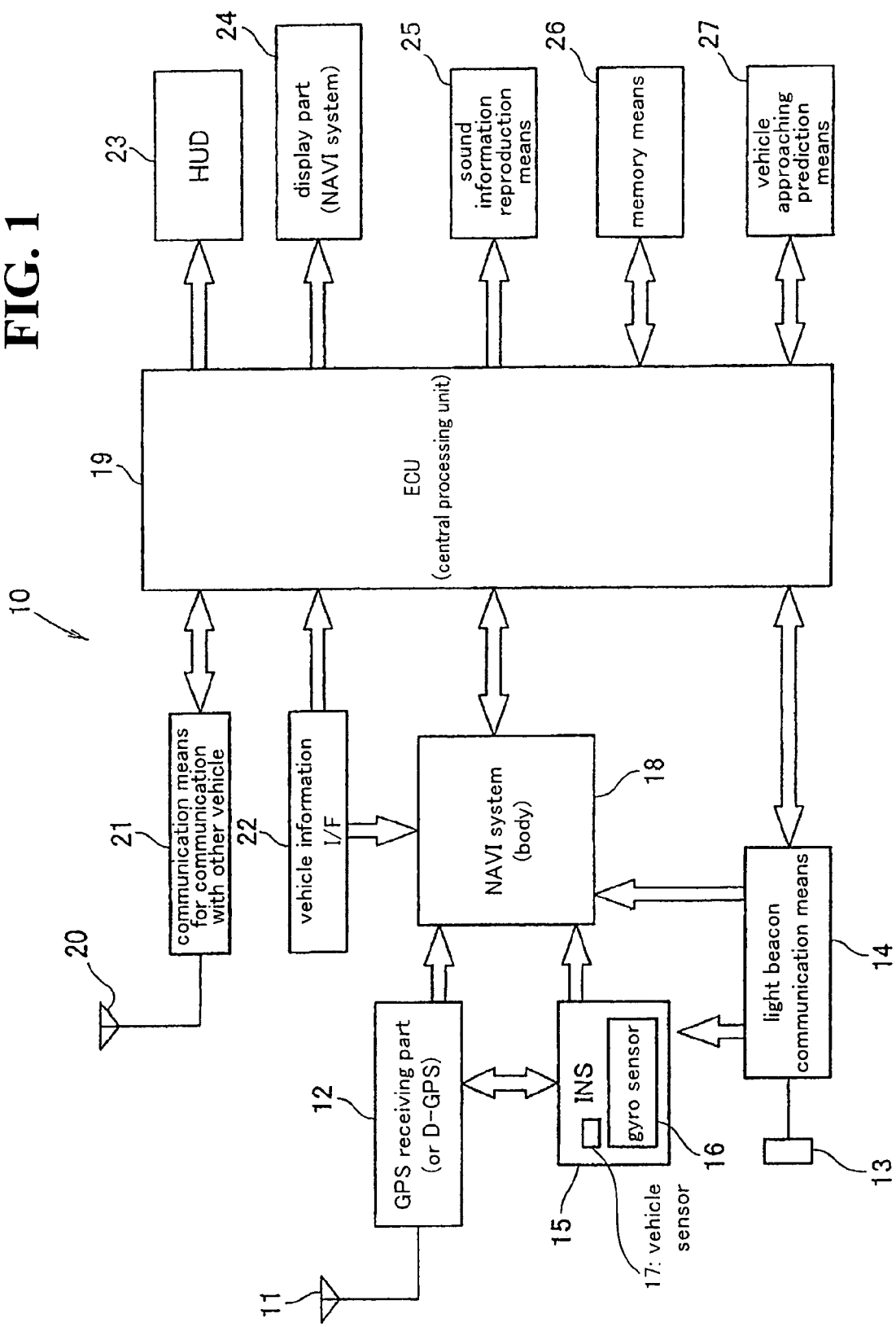
FIG. 1 is a block diagram of a vehicle position detection system according to an embodiment of the present invention which is mounted on a four-wheeled vehicle A.

The present invention will now be described in detail with reference to the accompanying drawings, wherein the same reference numerals will be used to identify the same or similar elements throughout the several views. It should be noted that the drawings should be viewed in the direction of orientation of the reference numerals.

FIG. 1 is a block diagram of a vehicle position detection system according to the present invention which is mounted on a four-wheeled vehicle A. The vehicle position detection system 10 is a system for detecting a position of a vehicle. The vehicle position detection system 10 includes a GPS (Global positioning system) receiving part 12, a light beacon communication means or device 14, an inertia navigation system (INS) 15, a navigation (NAVI) system 18, and a central processing unit 19. The GPS (Global positioning system) receiving part 12 has an antenna 11. The light beacon communication means or device 14 has a light receiving part 13 for receiving a light beacon, The inertia navigation system (INS) 15 has a gyro sensor 16 for detecting an azimuth of the vehicle and a vehicle speed sensor 17, and controls the advancing direction and a moving speed of the vehicle. The navigation (NAVI) system 18 has a map. The central processing unit 19 acquires information from the navigation (NAVI) system 18 and the light beacon communication means or device 14 and processes the information.

Furthermore, the vehicle position detection system 10 includes a communication means or device 21 having an antenna 20 for communication with other vehicle, and a vehicle information interface (I/F) 22. The vehicle position detection system 10 further includes an HUD (Head Up Display) 23, a display part 24 and a sound information reproduction means or device 25. Still further, the central processing unit 19 includes a memory means or device 26 and a vehicle approaching prediction means or device 27.

Figure 2:
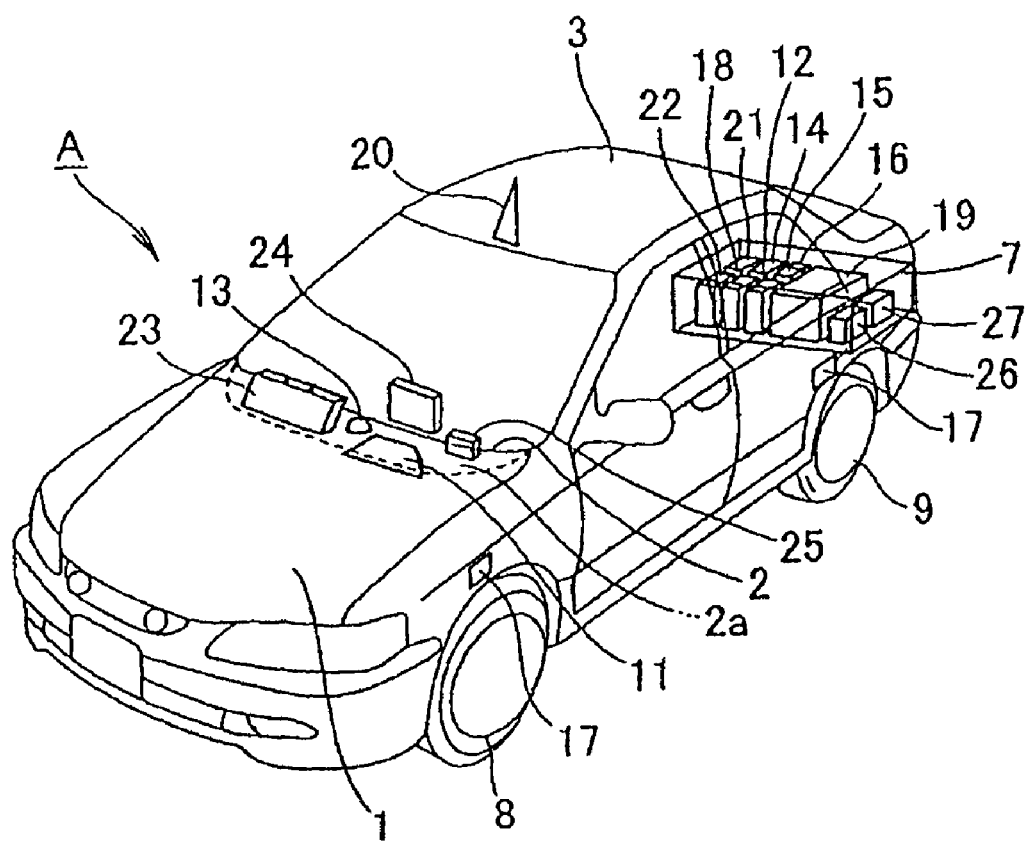
FIG. 2 is a perspective view showing an example in which the vehicle position detection system is mounted on the four-wheeled vehicle A.

FIG. 2 is a perspective view showing an example in which the vehicle position detection system is mounted on the four-wheeled vehicle A. The four-wheeled vehicle A has a hood 1. The antenna 11 is mounted on an upper surface 2a of a dashboard to receive the GPS signals. The HUD 23, the display part 24 and the sound information reproduction means or device 25 are mounted on an instrument panel 2. Furthermore, a light receiving part 13 and the antenna 20 are mounted on an upper portion of a roof 3. The light receiving part 13 receives optical signals such as near infrared beams which contain light beacon information. The antenna 20 is for communication with other vehicle.

In addition, the GPS receiving part or device 12, the light beacon communication means or device 14, the inertia navigation system (INS) 15, the gyro sensor 16, the navigation (NAVI) system 18, the central processing unit 19, the communication means or device 21 for communication with other vehicle, and the vehicle information interface (I/F) 22 are mounted on a rear portion of the four-wheeled vehicle A in a state that these parts are housed in a box 7. The central processing unit 19 includes the memory means or device 26 and the vehicle approaching prediction means or device 27. Furthermore, a vehicle speed sensor 17 is mounted on the four-wheeled vehicle A in the vicinity of wheels 8, 9.

Referring to FIG. 1, functions of the respective blocks of the vehicle position detection system 10 are explained hereinbelow.

The GPS receiving part or device 12 receives GPS signals from one or more GPS satellites. The GPS receiving part or device 12 may adopt a usual GPS, a D-GPS (Differential GPS) or the like.

The light beacon communication means or device 14 receives the light beacon information containing near infrared beams or the like from a light beacon arranged in front of an intersection of a trunk road by way of the light receiving part 13. The light beacon communication means or device 14 may function not only as the means or device for receiving the light beacon information but also as the means or device for transmitting information to the light beacon. The light beacon information received by the light beacon communication means or device 14 includes the vehicle lane information which contains a traveling lane on which the vehicle travels and position coordinates information containing position coordinates of the light beacon.

The gyro sensor 16 detects a yaw rate of the vehicle. The vehicle speed sensor 17 is a device for detecting a vehicle speed of the vehicle based on rotational pulses of the wheel of the vehicle. The inertia navigation system (INS) 15 estimates the present position of the vehicle based on a yaw rate value from the gyro sensor 16 and a vehicle speed value from the vehicle speed sensor 17. The navigation (NAVI) system 18 maps the measured present position on an electronic map.

The communication means or device 21 for communication with other vehicle performs the direct communication (inter-vehicle communication) between vehicles by way of the antenna 20. This device transmits the position of the vehicle and a kind of the vehicle at fixed intervals even when there is no other vehicle or no wireless communication facility on a road side in the vicinity of the device. A device using a relay on a road side (road-vehicle communication or vehicle road-vehicle communication) may be used as the communication means or device.

The HUD (Head Up Display) 23 displays information on a counterpart vehicle within a peripheral field of vision. The display part 24 displays navigation information, various kinds of manipulation screens, vehicle information and the like. The sound information reproduction means or device 25 generates sound messages and alarm sounds.

The central processing unit 19 mounted on the vehicle mainly performs a control of the whole device and, at the same time, has a function of correcting the position of the vehicle based on the information of the light beacon when the central processing unit 19 receives the light beacon information using the light beacon communication means or device 14. Furthermore, the central processing unit 19, after the light beacon communication means or device 14 receives the position coordinates information of the light beacon information, within a predetermined condition, calculates the vehicle position based on the light beacon information received by the light beacon communication means or device 14 and, at the same time, displays the calculated position of the vehicle on the display part 24 or stores the position of the vehicle in the memory means or device 26.

In addition, the central processing unit 19, after the light beacon communication means or device receives the position coordinates information of the light beacon information, assigns priority to the position of the vehicle based on a self-contained navigation using coordinates of the position coordinates information as a base point within the predetermined condition, and assigns priority to the position of the vehicle calculated based on GPS signals received by the GPS receiving part or device 12 outside the predetermined condition.

Furthermore, the central processing unit 19 includes a communication means or device 21 and a vehicle approaching prediction means or device 27. The communication means or device 21 exchanges the position coordinates information of the light beacon information with other vehicle. The vehicle approaching prediction means or device 27 performs the prediction of the approaching of the vehicle and other vehicle based on the position of the vehicle and the position of other vehicle. The position of the vehicle is determined based on the position coordinates information of the light beacon information. The position of other vehicle is received by the communication means or device 21 and is determined based on the position coordinates information of the light beacon information.

Figure 3:
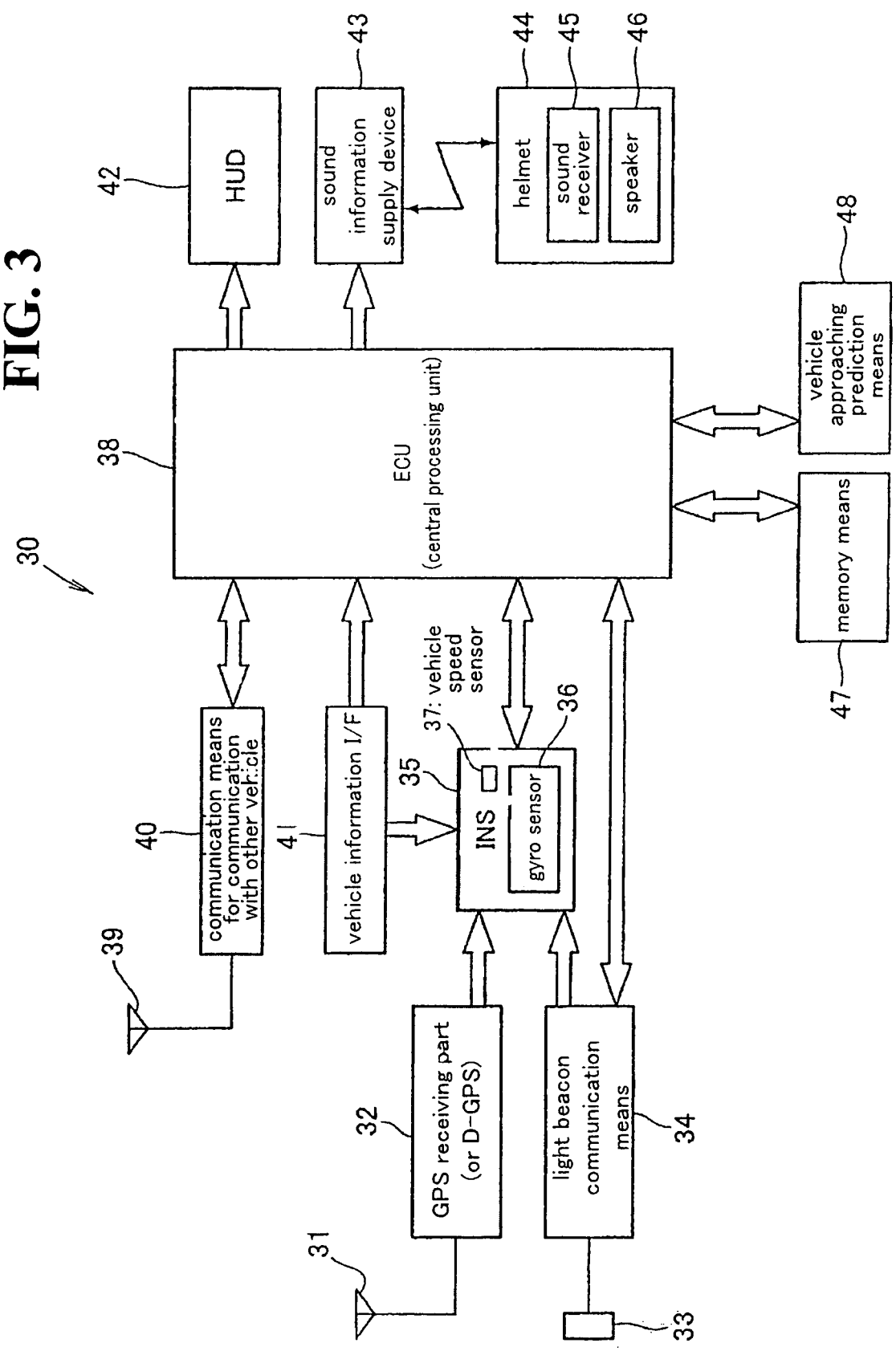
FIG. 3 is a block diagram of a vehicle position detection system according to an embodiment of the present invention which is mounted on a two-wheeled vehicle B.

FIG. 3 is a block diagram of the vehicle position detection system according to the present invention mounted on the two-wheeled vehicle B. The vehicle position detection system 30 includes a GPS receiving part or device 32 having an antenna 31, a light beacon communication means or device 34 having a light receiving part 33, an inertia navigation system (INS) 35, a gyro sensor 36, and a vehicle speed sensor 37. In addition, the vehicle position detection system 30 includes a central processing unit 38, a communication means or device 40 having an antenna 39 for communication with other vehicle, and a vehicle information interface (I/F) 41.

Furthermore, the vehicle position detection system 30 includes an HUD (Head Up Display) 42 and a sound information supply device 43. In addition, a helmet 44 of a rider who rides on the two-wheeled vehicle includes a sound receiver 45 and a speaker 46. The sound information supply device 43 and the sound receiver 45 are connected with each other via a wireless communication means or device such as a Bluetooth communication means or device, etc. The central processing unit 38 further includes a memory means or device 47 and a vehicle approaching prediction means or device 48.

Figure 4:
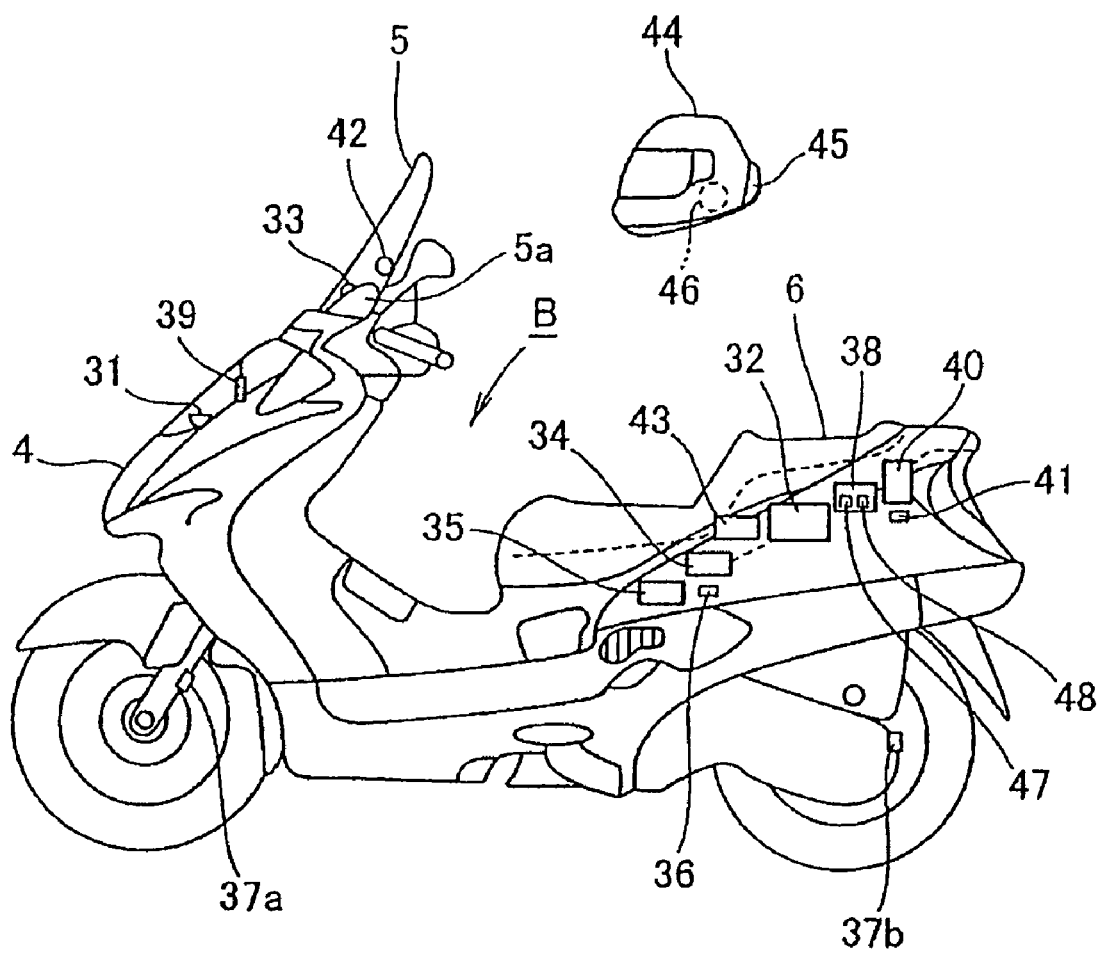
FIG. 4 is a perspective view showing an example in which the vehicle position detection system is mounted on the two-wheeled vehicle B.

FIG. 4 is a perspective view showing an example in which the vehicle position detection system is mounted on the two-wheeled vehicle B. The antenna 31 for receiving the GPS signals and the antenna 39 for communication with other vehicle are mounted on a front cover 4 of the two-wheeled vehicle B. A screen 5 is arranged in front of the meter bezel 5*a*. The light receiving part 33 and the HUD 42 are mounted on a meter bezel 5*a*. The light receiving part 33 receives optical signals such as near infrared beams containing the light beacon information.

In addition, the GPS receiving part or device 32, the light beacon communication means or device 34, the inertia navigation system (INS) 35, the gyro sensor 36, the central processing unit 38, the communication means or device 40 for communication with other vehicle, the vehicle information interface (I/F) 41, and the sound information supply device 43 are mounted on a lower portion of a seat 6. The central processing unit 38 includes the memory means or device 47 and the vehicle approaching prediction means or device 48. The sound receiver 45 and the speaker 46 are mounted on the helmet 44. Furthermore, vehicle speed sensors 37*a*, 37*b* are mounted in the vicinity of front and rear wheels. The system of this illustrated embodiment uses at least one of the vehicle speed sensors 37*a*, 37*b*.

Referring to FIG. 3, functions of the respective blocks of the vehicle position detection system are explained. The GPS receiving part or device 32 receives GPS signals from one or more GPS satellites. The GPS receiving part or device 32 may adopt a usual GPS, a D-GPS (Differential GPS) or the like.

The light beacon communication means or device 34 receives the light beacon information containing near infrared beams or the like from a light beacon arranged in front of an intersection of a trunk road by way of the light receiving part 33. The light beacon communication means or device 34 may function not only as the means or device for receiving the light beacon information but also as the means or device for transmitting information to the light beacon. The light beacon information received by the light beacon communication means or device 34 includes the vehicle lane information which contains a traveling lane on which the vehicle travels and position coordinates information containing position coordinates of the light beacon.

The gyro sensor 36 detects a yaw rate of the vehicle. The vehicle speed sensor 37 detects a vehicle speed of the vehicle based on rotational pulses of the wheel. The inertia navigation system (INS) 35 performs the estimation calculation of the present position of the vehicle based on a yaw rate value from the gyro sensor 36 and a vehicle speed value from the vehicle speed sensor 37.

The communication means or device 40 for communication with other vehicle performs the direct communication (inter-vehicle communication) between vehicles. This device transmits the position of the vehicle and a kind of the vehicle at fixed intervals even when there is no other vehicle or no wireless communication facility on a road side in the vicinity of the device. A device using a relay on a road side (road-vehicle communication or vehicle road-vehicle communication) may be used as the communication means or device. An HUD (Head Up Display) 42 displays information on a counterpart vehicle within a peripheral field of vision.

The sound information supply device 43 transmits sound information such as a sound message or an alarm sound to the sound receiver 45 mounted on the helmet 44 via a wireless communication means or device such as a Bluetooth or the like, for example. The sound receiver 45 mounted on the helmet 44 receives sound information such as a sound message or an alarm sound transmitted from the sound information supply device 43 and allows the speaker 46 to generate the sound message or the alarm sound.

The central processing unit 38 is mounted on the vehicle and mainly performs a control of the whole device. The central processing unit 38 has a function of correcting the position of the vehicle based on the information of the light beacon when the central processing unit 38 receives the light beacon information using the light beacon communication means or device 34. Furthermore, the central processing unit 38, after the light beacon communication means or device 34 receives the position coordinates information of the light beacon information, within a predetermined condition, calculates the vehicle position based on the light beacon information received by the light beacon communication means or device 34 and, at the same time, displays the calculated position of the vehicle on the display part or stores the position of the vehicle in the memory means or device 47.

In addition, the central processing unit 38, after the light beacon communication means or device 34 receives the position coordinates information of the light beacon information, assigns priority to the position of the vehicle based on a self-contained navigation which uses coordinates of the position coordinates information as a base point within the predetermined condition, and assigns priority to the position of the vehicle calculated based on GPS signals received by the GPS receiving part or device 32 outside the predetermined condition.

Furthermore, the central processing unit 38 includes a communication means or device 40 which exchanges the position coordinates information of the light beacon information of the vehicle with the position coordinates information of the light beacon information of other vehicle. The central processing unit 38 also includes a vehicle approaching prediction means or device 48 which performs the prediction of the approaching of the vehicle and other vehicle based on the position of the vehicle and the position of other vehicle. The position of the vehicle is determined based on the position coordinates information of the light beacon information. The position of other vehicle is received by the communication means or device 40 and is determined based on the position coordinates information of the light beacon information.

Figure 5:
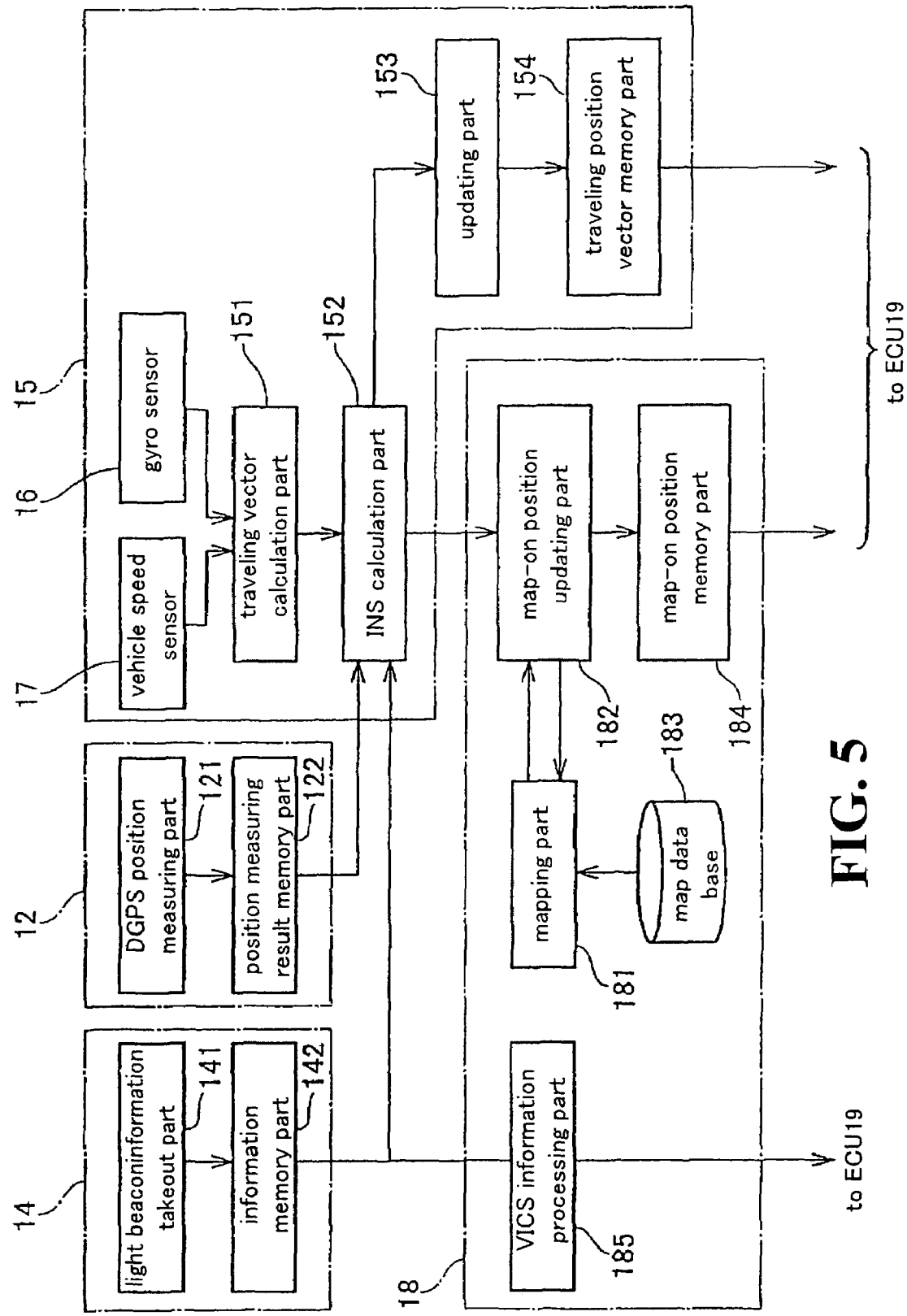
FIG. 5 is a block diagram showing the constitution of main parts having a position measuring function in a GPS receiving part or device, a light beacon communication means or device, an inertia navigation system, and a navigation (NAVI) system of the four-wheeled vehicle A.

FIG. 5 is a block diagram showing the constitution of main parts having a position measuring function in the GPS receiving part or device 12, the light beacon communication means or device 14, the inertia navigation system (INS) 15 and the navigation (NAVI) system 18 of the four-wheeled vehicle A. The blocks in FIG. 5 with the same reference numerals as FIG. 1 are identical or substantially identical parts.

In the GPS receiving part or device 12, a GPS position measuring part 121 periodically measures the present position based on times at which a plurality of GPS radio waves are received. The result of the latest position measurement is stored in the position measuring result memory part 122.

In the light beacon communication means or device 14, a light beacon information acquiring part 141 acquires position information of the light beacon, the vehicle lane information and the intersection information from the received light beacon signals. Position coordinates information of the light beacon, the vehicle lane information and the intersection information are stored in an information memory part 142.

A traveling vector calculation part 151 of the inertia navigation system (INS) 15 calculates a traveling vector (vehicle speed and advancing direction) of the vehicle based on a vehicle speed detected by the vehicle speed sensor 17 and an azimuth detected by the gyro sensor 16. An INS calculation part 152 periodically calculates the present position of the vehicle based on the result of position measurement and the traveling vector as a traveling position vector which is registered using the present position as a starting point (hereinafter "traveling position vector"). The result of calculation is updated and registered in a traveling position vector memory part 154 by an updating part 153.

In the NAVI system 18, a mapping part 181 performs mapping of the present position on an electronic map based on the present position of the vehicle informed by a map-on position updating part 182 and electronic map information preliminarily stored on the map database (DB) 183. The present position mapped on the electronic map is informed to the map-on position updating part 182. The map-on position updating part 182 registers the informed map-on position of the vehicle in a map-on position memory part 184. The map-on position and the traveling position vector are fed to the central processing unit 19. Furthermore, the NAVI system 18 receives the VICS (Vehicle Information and Communication System) information from the light beacon communication means or device 14, processes the VICS information using a VICS information processing part 185, and feeds the VICS information to the center processing unit 19.

Figure 6:
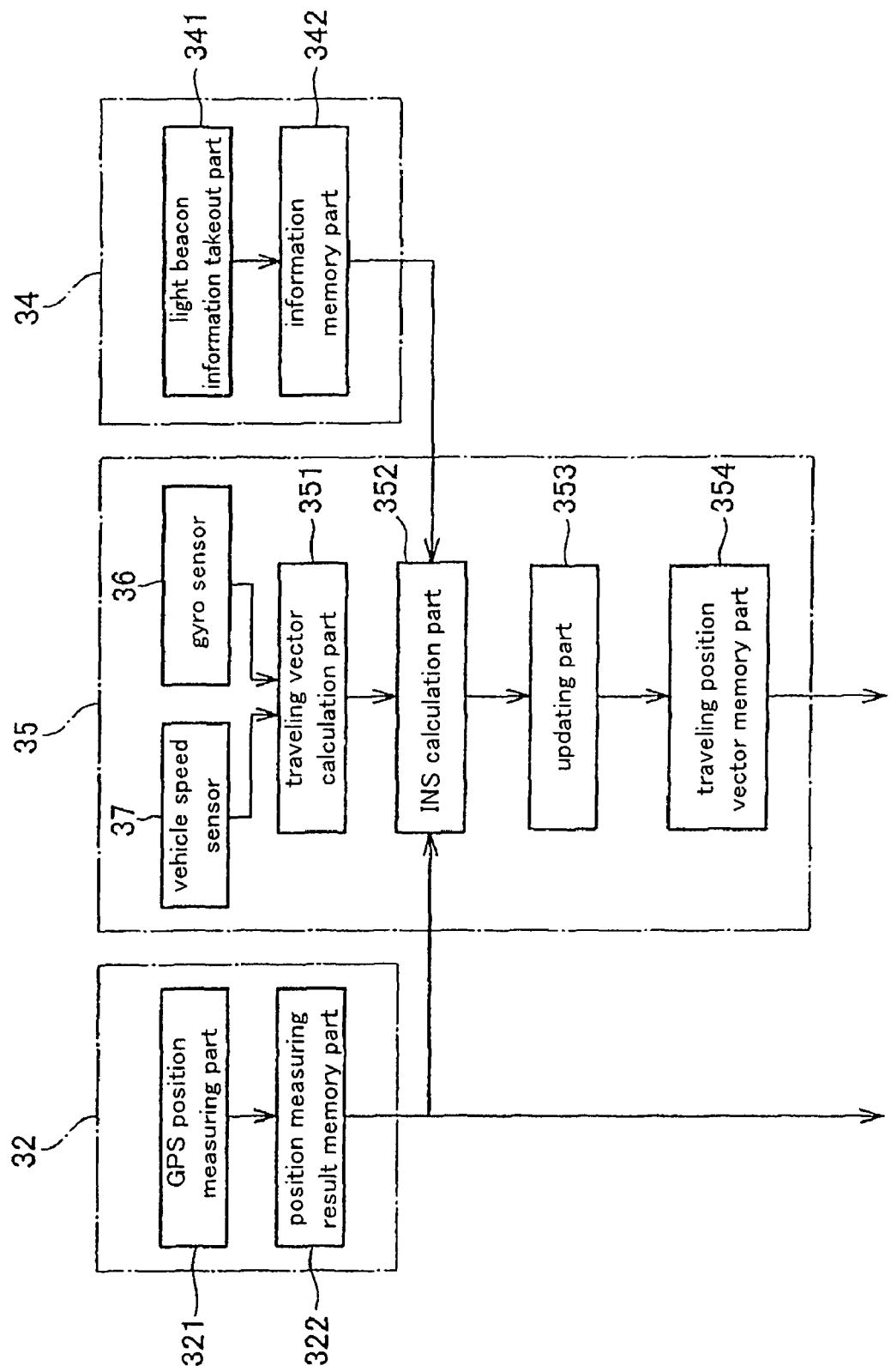
FIG. 6 is a block diagram showing the constitution of main parts of a GPS receiving part or device, a light beacon communication means or device and an inertia navigation system mounted on the two-wheeled vehicle B.

FIG. 6 is a block diagram showing the constitution of main parts of a GPS receiving part or device 32, a light beacon communication means or device 34 and an inertia navigation system (INS) 35 mounted on the two-wheeled vehicle B. The blocks in FIG. 6 with the same reference numerals as FIG. 3 are identical or substantially identical parts.

A GPS position measuring part 321 periodically measures the present position based on times at which a plurality of GPS radio waves are received. The result of the latest position measurement is stored in a position measuring result memory part 322.

In the light beacon communication means or device 34, a light beacon information acquiring part 341 acquires position information of the light beacon, the vehicle lane information and intersection information from the received light beacon signals. The position coordinates information of the light beacon, the vehicle lane information and the intersection information are stored in an information memory part 342.

A traveling vector calculation part 351 calculates the traveling vector of the vehicle based on a vehicle speed detected by the vehicle speed sensor 37 and an azimuth detected by the gyro sensor 36. An INS calculation part 352 periodically calculates a traveling vector of the vehicle based on the result of position measurement and the traveling vector. The result of calculation is updated and registered in a traveling position vector memory part 354 by an updating part 353.

Figure 7:
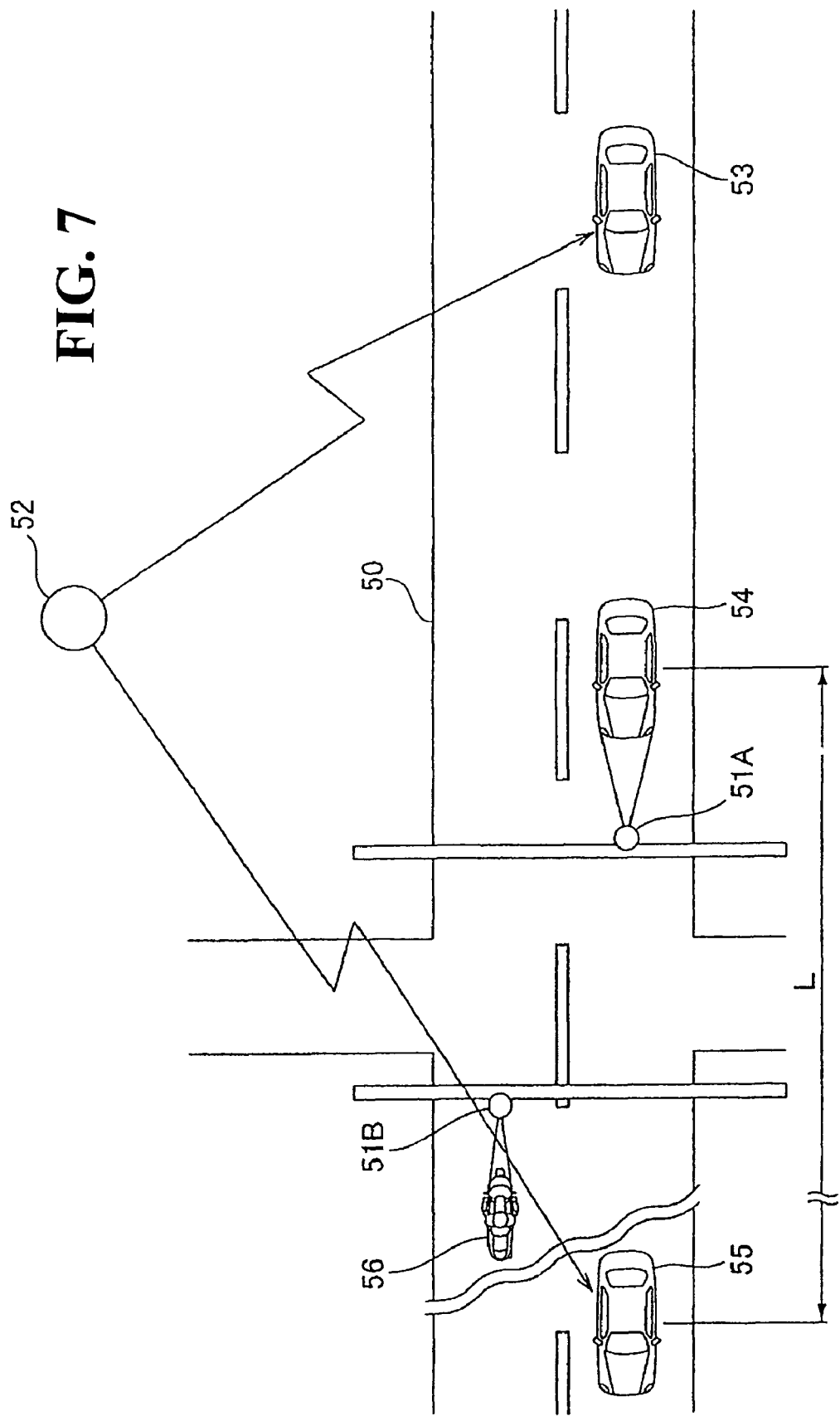
FIG. 7 is a view showing positions of vehicles on a road.

Next, steps and processes in the respective devices in using the vehicle position detection system according to this embodiment are explained in detail in conjunction with FIG. 7 to FIG. 12. FIG. 7 is a view showing positions of a vehicle on a road. In FIG. 7, reference numeral 50 indicates a road, reference numeral 51A, 51B indicate light beacons, reference numeral 52 indicates a GPS satellite, reference numeral 53 indicates the vehicle before receiving the light beacon, reference numeral 54 indicates the vehicle after receiving the light beacon, and reference numeral 55 indicates the vehicle after receiving the light beacon outside the predetermined condition. Furthermore, reference numeral 56 indicates other vehicle (two-wheeled vehicle).

Figure 8:
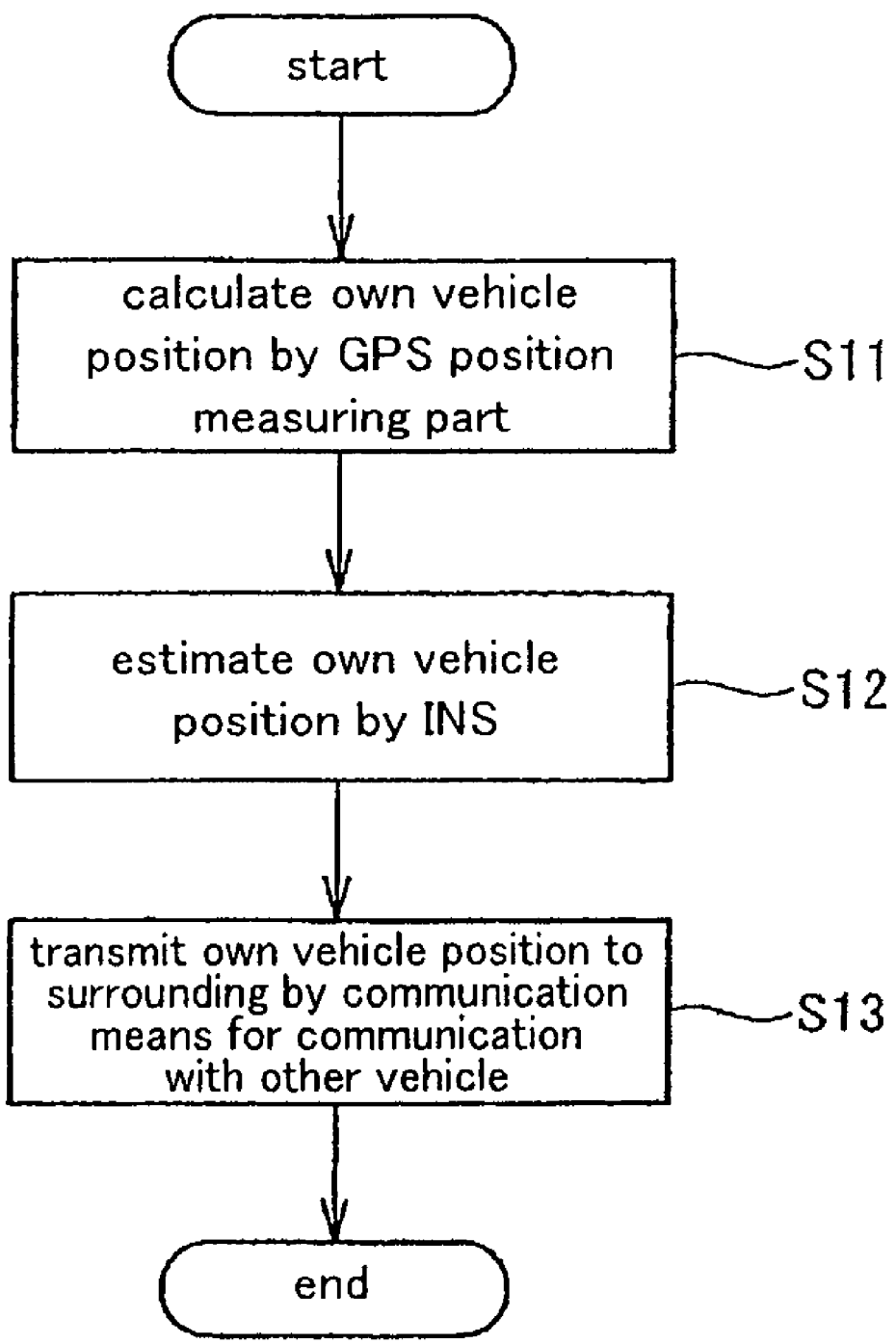
FIG. 8 is a flowchart showing the manner of operation of the vehicle position detection system on the vehicle before receiving light beacon information.

First of all, the manner of operation of the vehicle position detection system with respect to the vehicle 53 before receiving the light beacon is explained in conjunction with a flowchart shown in FIG. 8.

In Step S11, the GPS position measuring part 121 calculates the position of the vehicle based on the GPS satellite signals. In Step S12, the inertia navigation system (INS) 15 estimates the position of the vehicle based on the GPS position measuring result and signals from the gyro sensor 16 and the speed sensor 17 at intervals (for example, for every 100 ms) shorter than intervals (1 second) of the GPS satellite signals. In Step S13, the communication means or device 21 for communication with other vehicle transmits the estimated position of the vehicle to the surrounding intermittently (for example, for every 100 ms).

Figure 9:
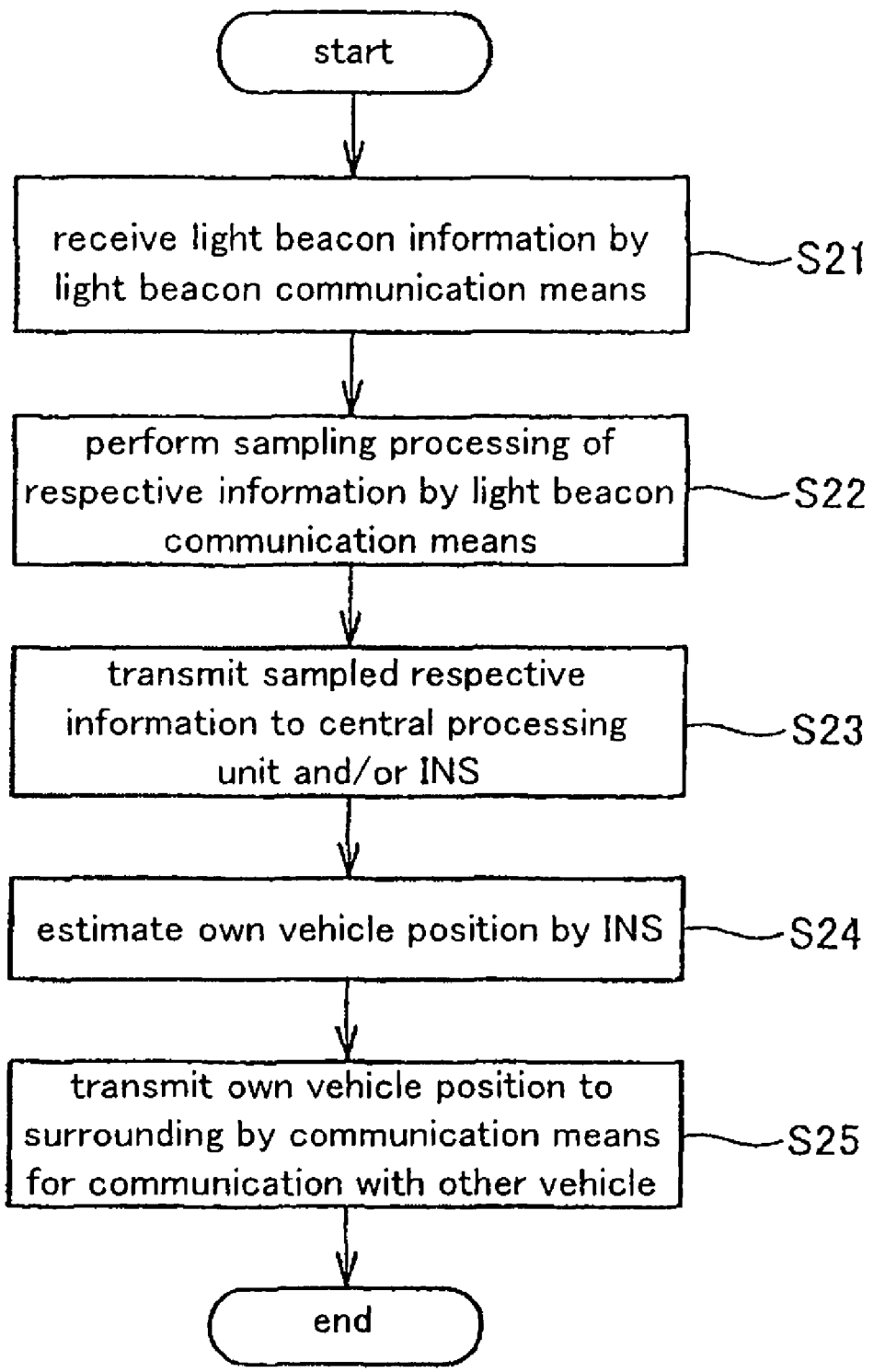
FIG. 9 is a flowchart showing the manner of operation when the light beacon information is received.

Next, the manner of operation of the vehicle when the vehicle receives signals from the light beacon 51 on the vehicle lane as in the case of the vehicle 54 shown in FIG. 7 is explained in conjunction with a flowchart shown in FIG. 9.

In Step S21, the light beacon communication means or device 14 of the vehicle receives the light beacon information from the light beacon 51A on the road. In Step S22, the light beacon communication means or device 14 samples and processes the measured position coordinates of a point where the beacon is received, the vehicle lane information (lane number), the coordinates of an intersection located in front of the vehicle in the advancing direction of the vehicle (node data), information on roads which are connected with the intersection (link data) and the like from the data transmitted from the light beacon 51A. In Step S23, the respective sampled information is transmitted to the central processing unit 19 and/or the INS 15.

Here, the light beacon communication means or device 14 may be configured to only transmit a data row obtained by decoding the signals from the light beacon 51A to the central processing unit 19 and/or the INS 15 as it is. In such a case, the data sampling processing is performed by the central processing unit 19 and/or the INS 15.

A transmission/reception range of the light beacon is generally set within a rectangular range having one side of approximately 3.5 m. On the other hand, with respect to lane widths stipulated by road standards (based on the Road Structure Ordinance), a lane width of a trunk road along which a large number of light beacons are installed is set to approximately 3.5 m, and a lane width of a small-sized road is set to approximately 3.25 m. Accordingly, there is little possibility that the vehicle erroneously receives position coordinates of a neighboring lane.

When the vehicle receives two light beacon signals simultaneously, the central processing unit 19 determines that the vehicle travels on or in the vicinity of a zoning line of lanes and processes the case such that the vehicle passes through an intermediate point between the respective measured coordinates of the two neighboring lanes.

In Step S24, the INS 15 estimates the position of the vehicle based on the measured coordinates (in place of the GPS position measuring result) and signals from the gyro sensor 16, the speed sensor 17 at predetermined intervals (for example, for every 100 ms). In Step S25, the communication means or device 21 for communication with other vehicle transmits the estimated position of the vehicle to the surrounding intermittently (for example, for every 100 ms). By transmitting the vehicle lane information together with the position of the vehicle simultaneously, it is possible to facilitate the sampling of the target vehicle by other vehicle which receives the vehicle information.

Next, the manner of operation of the vehicle when the vehicle receives an other-vehicle signal from other vehicle (a two-wheeled vehicle) 56 as shown in FIG. 7 using the communication means or device 21 for communication with other vehicle is explained in conjunction with a flowchart shown in FIG. 10.

In Step S31, in the vehicle 54, the light beacon communication means or device 14 receives the light beacon information from the light beacon 51A. In Step S32, the communication means or device 21 for communication with other vehicle transmits an intersection position and a traveling position vector. In Step S41, in the two-wheeled vehicle 56, the light beacon communication means or device 34 receives the light beacon information from the light beacon 51B. In Step S42, it is determined whether the communication means or device 40 for communication with other vehicle receives the other-vehicle signal or not. When it is determined that the communication means or device 40 for communication with other vehicle does not receive the other-vehicle signal, the communication means or device 40 for communication with other vehicle waits for the other-vehicle signal. When it is determined that the communication means or device 40 for communication with other vehicle receives the other-vehicle signal, the processing advances to next step S43.

In Step S43, a present position of the vehicle is accurately specified based on position measurement result using the light beacon information, and a traveling position vector of the present position is obtained. In Step S44, the intersection to which the vehicle approaches is identified based on the traveling position vector of the vehicle and the coordinates of the respective intersections. In Step S45, the traveling position vector of the vehicle and the coordinates of the intersection to which the vehicle approaches are transmitted together with the ID of the vehicle, the estimated position, the vehicle state and the like.

In Step S33, it is determined whether the four-wheeled vehicle 54 receives the signal transmitted from the two-wheeled vehicle 56 or not. If the four-wheeled vehicle 54 does not receive the signal, the four-wheeled vehicle 54 waits for the reception of the signal. If the four-wheeled vehicle 54 receives the signal, the processing advances to next step S34.

In Step S34, all vehicles having the possibility of intersecting the vehicle are sampled as target vehicles based on the traveling position vector of the vehicle registered in the traveling position vector memory part 154 and the traveling position vectors notified from the respective vehicles.

In view of the above, the technical feature lies in that the navigation is changed over to the self-contained navigation using the measured coordinates obtained based on the GPS position measurement as the base point immediately after receiving the light beacon.

Next, the following explanation is made with respect to a case in which a sufficient time or traveling distance passes after receiving information from a light beacon 51 A as in the case of the vehicle position indicated by the reference numeral 55 in FIG. 7.

Figure 11:
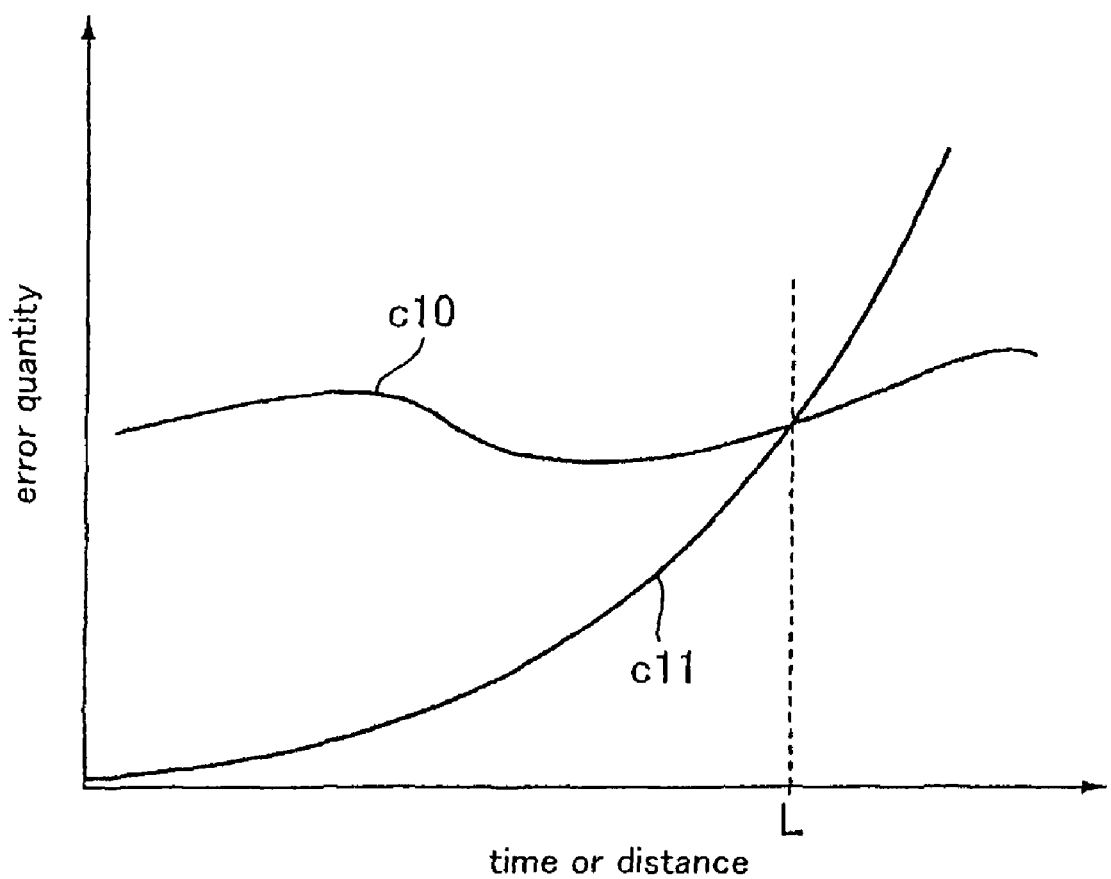
FIG. 11 is a graph showing a change with time of an error quantity between an actual position and an estimated position when time, distance or the like passes.

FIG. 11 is a graph showing a change with time of an error quantity between an actual position and an estimated position when time, distance or the like passes. A curve C10 indicates an error between the actual position and the estimated position attributed to the GPS, and a curve C11 indicates a change with time of an error between the actual position and the estimated position attributed to the self-contained navigation after the light beacon is received.

An origin indicates a point of time at which the light beacon is received. As can be understood from FIG. 11, for some time immediately after receiving the light beacon, it is possible to expect the higher coordinate accuracy by performing the self-contained navigation using the measured coordinates as the base point than by relying on the result of the GPS position measurement. However, an accumulated error attributed to the self-contained navigation increases to exceed the GPS position measurement error after a sufficient time, a sufficient traveling distance or the right or left turning (change of advancing direction). In FIG. 11, this reference point L indicates the time or distance when/where the error of the self-contained navigation starts to exceed the GPS position measurement error. Accordingly, when the fixed time or the distance passes upon receiving the light beacon, it is necessary to return the vehicle position to the GPS position measurement (self-contained navigation based on the GPS position measurement).

For determining the timing/distance L, the following four techniques are considered.

Technique 1 (distance-system) is a technique which returns the vehicle position to the GPS position measurement by using the fixed distance traveling from the measured coordinates which become the base point obtained from the light beacon information as a trigger. A value of the fixed distance may be set to 1000 m, for example.

Technique 2 (time-system) is a technique which returns the vehicle position to the GPS position measurement when a fixed time passes from a point of time that the measured coordinates is received. The measured coordinates become the base point obtained from the light beacon information. A value of the fixed time may be set to 10 minutes, for example.

Technique 3 (left-and-right-cumulative-system) is a technique which returns the vehicle position to the GPS position measurement when an advancing direction changing angle in the lateral direction and a cumulative value of number of times of advancing direction changing from the measured coordinates exceed predetermined values. The measured coordinates become the base point obtained from the light beacon information.

Technique 4 (distance/time/left-and-right-turning composite system) is a technique which uses the above-mentioned techniques 1 to 3 in combination. The technique may use an inclusive OR or a conditional expression. As an example of the conditional expression, the following formula (1) may be considered.

$$\Delta E \leq \Delta L + \Delta T + N \cdot A \qquad (1)$$

Here, $\Delta E$ is a threshold value, $\Delta L$ is an index of distance from the base point, $\Delta T$ is an index of lapsed time from received time, N is an index of number of change of advancing direction (for example, when the change of advancing direction at a predetermined angular velocity continues for 2 or more seconds, one time is counted), and A is an advancing direction changing angle (for example, a cumulative value of absolute values of transition angles per respective one times).

By returning the vehicle position to the GPS position measurement using the above-mentioned four techniques, it is possible to determine the position using the position measuring method with a small error quantity.

Figure 12:
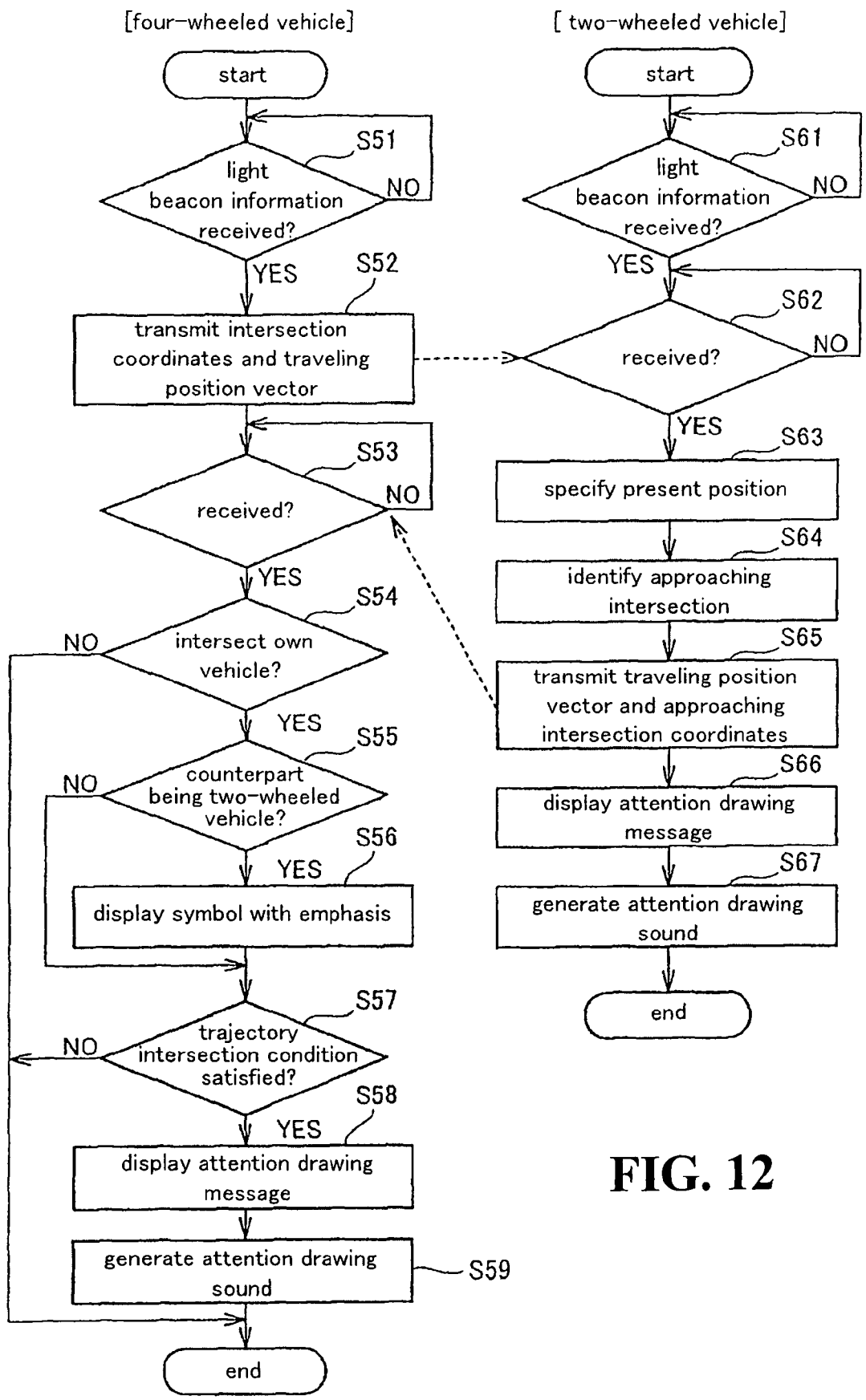
FIG. 12 is a flowchart showing the processing of a vehicle approaching prediction means or device.

Next, the manner of operation of the vehicle approaching prediction means or device is explained using a flowchart shown in FIG. 12.

In Step S51, the four-wheeled vehicle 54 receives the light beacon information. In Step S52, the coordinates of all recognized intersections and the traveling position vector of the vehicle are transmitted to all vehicles with which the communication link is satisfied as data together with the ID of the vehicle, the estimation position, the arrival time at the intersections, the number of received sets, and the vehicle state (brake, turn signals and the like). In the ID, the identification information intrinsic to the vehicle is preliminarily registered together with a kind of the vehicle (such as the distinction between the two-wheeled vehicle and the four-wheeled vehicle).

In Step S61, the two-wheeled vehicle 56 receives the light beacon information from the light beacon 51B. In Step S62, it is determined whether the two-wheeled vehicle 56 receives the data transmitted from the four-wheeled vehicle 54 or not. If the two-wheeled vehicle 56 does not receive the data transmitted from the four-wheeled vehicle 54, the two-wheeled vehicle 56 waits for the reception of the data. If the two-wheeled vehicle 56 receives the data transmitted from the four-wheeled vehicle 54, the processing advances to next step S63.

In Step S63, the present position of the vehicle is accurately specified based on the poison measurement result using the light beacon information, and the traveling position vector of the present position is obtained. In Step S64, the intersection to which the vehicle approaches is identified based on the traveling position vector of the vehicle and the coordinates of the respective intersections. In Step S65, the traveling position vector of the vehicle and the coordinates of the intersection to which the vehicle approaches are transmitted together with the ID of the vehicle, the estimated position, the vehicle state and the like.

In Step S53, it is determined whether the four-wheeled vehicle 54 receives the signal transmitted from the two-wheeled vehicle 56 or not. If the four-wheeled vehicle 54 does not receive the signal, the four-wheeled vehicle 54 waits for the reception of the signal. If the four-wheeled vehicle 54 receives the signal, the processing advances to next step S54.

In Step S54, all vehicles having the possibility of intersecting the vehicle are sampled as target vehicles based on the traveling position vector of own vehicle registered in the traveling position vector memory part 154 and the traveling position vectors notified from the respective vehicles. In Step S55, it is determined whether the target vehicle is a two-wheeled vehicle or not based on the ID. In Step S56, if the target vehicle is the two-wheeled vehicle, a symbol indicative of the present position of the vehicle is displayed on the NAVI display part 16 in an emphasized manner together with a symbol of the vehicle and symbols of other target vehicles.

In Step S57, with respect to all sampled target vehicles, it is determined whether a trajectory intersecting condition is satisfied or not based on times at which the vehicle and the respective other vehicles arrive at the intersection. For example, assuming the time at which the vehicle (four-wheeled vehicle 54) arrives at the intersection as t2 and the time at which the target vehicle (two-wheeled vehicle 56) arrives at the intersection as t3, it is determined that the trajectory intersecting condition is satisfied provided that a following formula (2) is satisfied.

$$|t2 - t3| \leq t_{REF} \qquad (2)$$

Here, $t_{REF}$ indicates a predetermined reference time difference.

In Step S58, when there is a vehicle satisfying the trajectory intersecting condition, a symbol for drawing an attention is displayed on the HUD. In Step S59, an alarming sound or a sound message is outputted also from a speaker.

In Step S66, the two-wheeled vehicle 56, after transmitting the traveling position vector of the vehicle, displays a symbol for drawing an attention on the HUD. In Step S67, a sound message, an alarming sound or the like for drawing an attention is outputted to a helmet of a driver from a sound transmitter.

According to this embodiment, the vehicle on which the NAVI system is not mounted can also recognize the position of the intersections and the positions of other vehicles based on the information provided from the light beacon.

With respect to the measured coordinates for the respective lanes out of the data transmitted form the light beacon, the correction value updated data of the D-GPS may be transmitted in place of the measured coordinates. In this case, each vehicle adopts the D-GPS system.

In addition, without providing the direct information exchange communication between the vehicles, the present invention may use the two-way communication function of transmission and reception which the light beacon possesses.

In this case, an outflow/inflow vehicle identification system is provided on an intersection side, and a light beacon communication means or device and a broadcasting wireless communication means or device are connected to the system. When each vehicle passes below the light beacon, the vehicle information is notified to the outflow/inflow vehicle identification system, and the outflow/inflow vehicle identification system collectively notifies the notified outflow/inflow vehicles to vehicles in the vicinity of the intersection using the broadcasting wireless notification means or device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle position detection system for detecting a position of a vehicle, the vehicle position detection system comprising:
   a GPS receiving device mounted on the vehicle to receive GPS signals from a GPS satellite indicating a position of the vehicle;
   a light beacon communication device mounted on the vehicle to receive light beacon information from a light beacon arranged in front of an intersection of a road; and
   a central processing unit mounted on the vehicle to correct the position of the vehicle indicated by the GPS signals based on the light beacon information upon reception of the light beacon information by the light beacon communication device unless the vehicle travels, starting from the reception of the light beacon information by the light beacon communication device, for more than a predetermined time or a predetermined distance.

2. The vehicle position detection system according to claim 1, wherein the light beacon information includes vehicle lane information and position coordinates information, wherein the vehicle lane information contains a traveling lane on which the vehicle travels, and the position coordinates information contains position coordinates of the light beacon.

3. The vehicle position detection system according to claim 2, wherein the central processing unit, after the light beacon communication device receives the position coordinates information of the light beacon information, calculates the position of the vehicle based on the light beacon information received by the light beacon communication device and, at the same time, stores the position of the vehicle in a memory device or displays the calculated position of the vehicle on a display part until the vehicle travels, starting from the reception of the light beacon information by the light beacon communication device, for more than the predetermined time or the predetermined distance.

4. The vehicle position detection system according to claim 3, wherein the central processing unit includes a communication device which directly communicates with a surrounding vehicle and directly exchanges the position coordinates information of the light beacon information with position coordinates information of light beacon information of the surrounding vehicle with the surrounding vehicle.

5. The vehicle position detection system according to claim 2, wherein the central processing unit, after the light beacon communication device receives the position coordinates information of the light beacon information, assigns priority to the position of the vehicle based on a self-contained navigation using coordinates of the position coordinates information as a base point until the vehicle travels, starting from the reception of the light beacon information by the light beacon communication device, for more than the predetermined time or the predetermined distance, and assigns priority to the position of the vehicle calculated based on the GPS signals received by the GPS receiving device after the vehicle travels, starting from the reception of the light beacon information by the light beacon communication device, for more than the predetermined time or the predetermined distance.

6. The vehicle position detection system according to claim 5, wherein the central processing unit includes a vehicle approaching prediction device which performs the prediction of approaching of the vehicle and other vehicle based on the position of the vehicle and a position of the other vehicle, wherein the position of the vehicle is determined based on the position coordinates information of the light beacon information, and the position of the other vehicle is determined based on the position coordinates information of the light beacon information received by the communication device.

7. A vehicle position detection system for detecting a position of a vehicle, the vehicle position detection system comprising:
   a GPS receiving device mounted on the vehicle to receive GPS signals from a GPS satellite;
   a light beacon communication device mounted on the vehicle to receive light beacon information from a light beacon arranged in front of an intersection of a road; and
   a central processing unit mounted on the vehicle to determine a position of the vehicle based on at least one of the GPS signals and the light beacon information, wherein the central processing unit determines the position of the vehicle using the light beacon information instead of the GPS signals unless the vehicle travels, starting from the reception of the light beacon information by the light beacon communication device, for more than a predetermined time or a predetermined distance.

8. The vehicle position detection system according to claim 7, wherein the light beacon information includes vehicle lane information and position coordinates information, wherein the vehicle lane information contains a traveling lane on which the vehicle travels, and the position coordinates information contains position coordinates of the light beacon.

9. The vehicle position detection system according to claim 8, wherein the central processing unit, after the light beacon communication device receives the position coordinates information of the light beacon information, calculates the position of the vehicle based on the light beacon information received by the light beacon communication device and stores the position of the vehicle in a memory device or displays the calculated position of the vehicle on a display part until the vehicle travels, starting from the reception of the light beacon information by the light beacon communication device, for more than the predetermined time or the predetermined distance.

10. The vehicle position detection system according to claim 9, wherein the central processing unit includes a communication device which directly communicates with a surrounding vehicle and directly exchanges the position coordinates information of the light beacon information with position coordinates information of light beacon information of the surrounding vehicle with the surrounding vehicle.

11. The vehicle position detection system according to claim 8, wherein the central processing unit, after the light beacon communication device receives the position coordinates information of the light beacon information, assigns priority to the position of the vehicle based on a self-contained navigation using coordinates of the position coordinates information as a base point until the vehicle travels, starting from the reception of the light beacon information by the light beacon communication device, for more than the predetermined time or the predetermined distance, and assigns priority to the position of the vehicle calculated based on the GPS signals received by the GPS receiving device outside the predetermined condition after the vehicle travels, starting from the reception of the light beacon information by the light beacon communication device, for more than the predetermined time or the predetermined distance.

12. The vehicle position detection system according to claim 11, wherein the central processing unit includes a vehicle approaching prediction device which performs the prediction of approaching of the vehicle and other vehicle based on the position of the vehicle and a position of the other vehicle, wherein the position of the vehicle is determined based on the position coordinates information of the light beacon information, and the position of the other vehicle is determined based on the position coordinates information of the light beacon information received by the communication device.

* * * * *